United States Patent [19]

Slaymaker et al.

[11] 3,739,560

[45] June 19, 1973

[54] TRANSPORT LOCK LINK FOR A MOWER CONDITIONER

[75] Inventors: Wilbur L. Slaymaker, Kinzers; John H. Long, Narvon, both of Pa.

[73] Assignee: Sperry Rand Corporation, New Holland, Pa.

[22] Filed: Mar. 28, 1972

[21] Appl. No.: 238,857

[52] U.S. Cl. ................................ 56/228, 92/15
[51] Int. Cl. ............................................ A01d 75/22
[58] Field of Search ........... 56/1, 214, 228, DIG. 1, 56/208; 92/15, 18; 172/446, 466, 494, 481

[56] References Cited
UNITED STATES PATENTS

| | | | |
|---|---|---|---|
| 2,809,574 | 10/1957 | Hill | 56/228 |
| 3,100,373 | 8/1963 | Blanshine | 56/214 |
| 3,535,860 | 10/1970 | Schwalm et al. | 56/228 |
| 1,497,695 | 6/1924 | Hobbs | 172/481 |
| 2,284,388 | 5/1942 | Gurries | 172/466 |
| 2,605,686 | 8/1952 | Starr | 172/466 |
| 2,952,472 | 9/1960 | McNeill | 172/466 |

Primary Examiner—Antonio F. Guida
Attorney—John C. Thompson, Joseph A. Brown, Larry L. Coats et al.

[57] ABSTRACT

A transport lock link assembly for a pull type mower conditioner having an L-shaped main frame and a header moveably supported thereby via an actuating linkage structure interconnected between said header and said main frame. The lock link assembly of the present invention particularly comprises a lock link having one end operatively connected to said actuating linkage structure and the other end confined and moveable within a generally L-shaped slot structure having removeable stop means associated therewith for selectively maintaining the end of the lock link confined within said slot in either an operating mode or a transport lock mode.

5 Claims, 5 Drawing Figures

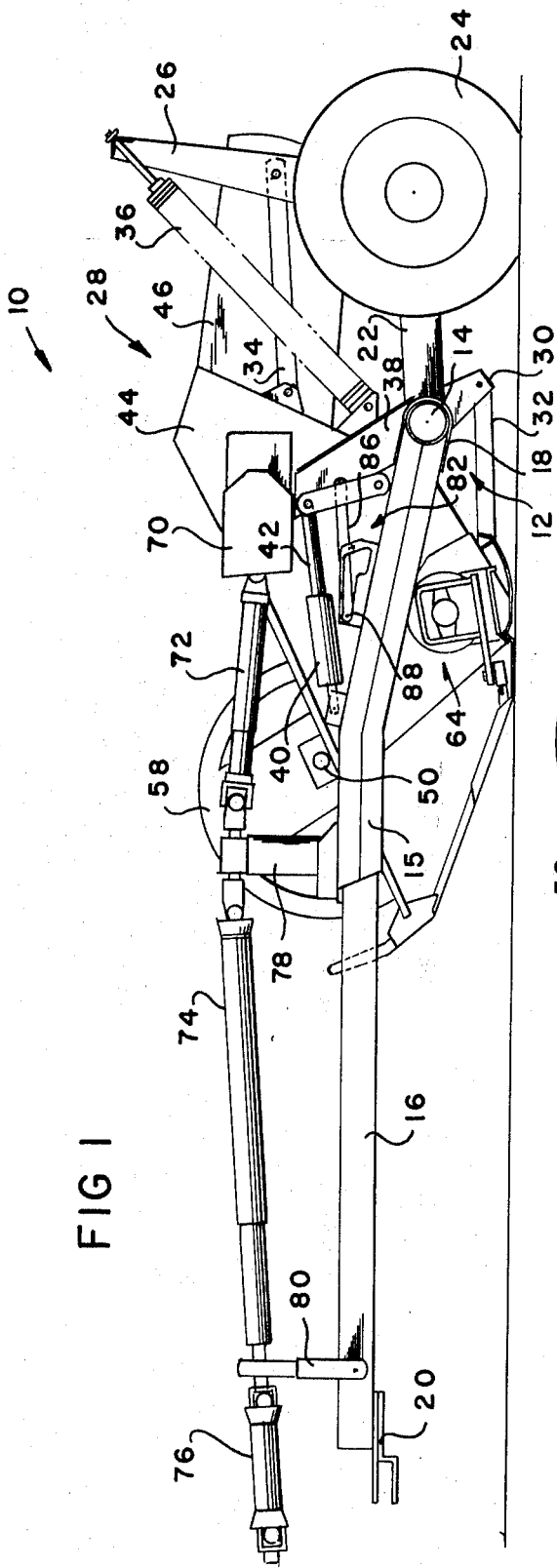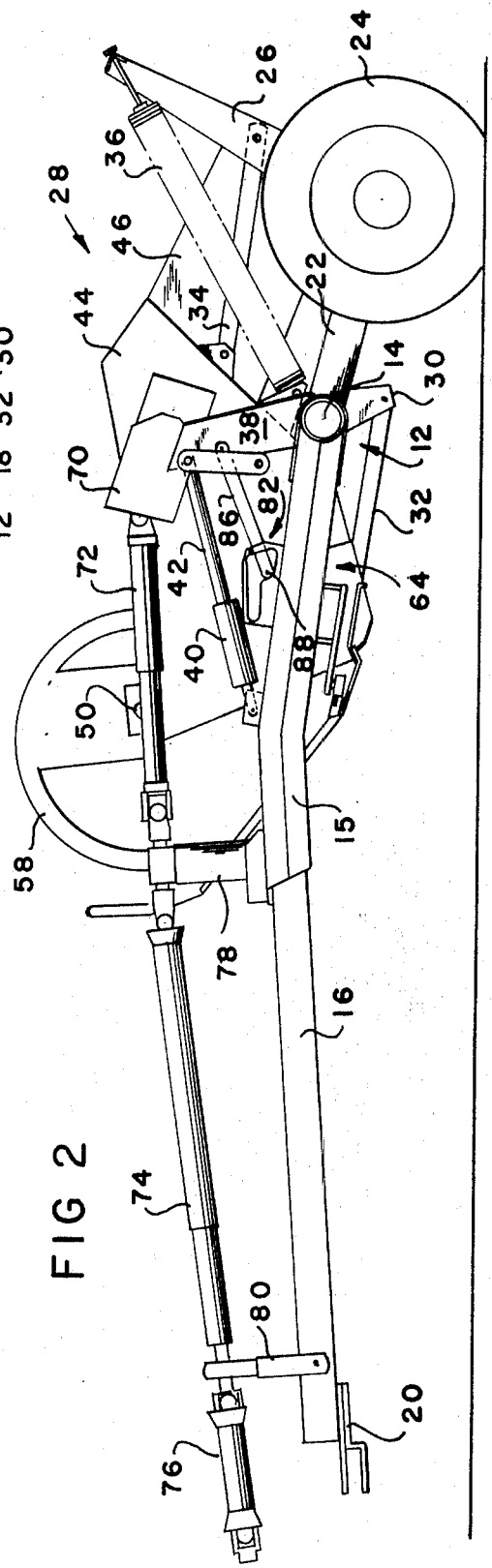
FIG 1
FIG 2

TRANSPORT LOCK LINK FOR A MOWER CONDITIONER

BACKGROUND OF THE INVENTION

The present invention relates to agricultural machinery, and more particularly to a pull type mower conditioner provided with a lock link assembly for maintaining the header thereof in a raised transport position.

Attempts have been made in the past to provide agricultural harvesting machines with a transport lock system for maintaining the header in a raised transport position relative to the main frame of the harvesting machine. However, many of the transport lock systems of the prior art have been expensive and complicated even to the point of requiring tools to actuate. Also, in some cases the transport lock system required additional parts in order to place in the transport lock mode and, therefore, necessitated the removal and storage of such parts upon changing from the transport lock mode to an operative mode.

SUMMARY OF THE INVENTION

Applicants have devised a simple, reliable, inexpensive and easy to actuate transport lock systems for the header of an agricultural harvesting machine. In particular, applicants' invention relates to a lock link having one end connected to a lever arm operative to raise the header to a transport position and the other end confined within a generally L-shaped slot structure fixed to the main frame of the harvesting machine. The slot structure includes a first area particularly shaped and spaced to allow the transport lock link to freely move therein during the operative mode of said header, and a second area disposed adjacent and generally below said first area for receiving said other end of said transport lock link and maintaining that end generally stationary, thereby maintaining the header in a transport lock position. Said first and second areas are effectively separated by a cotter pin which traverses the vertical plane of the lock link. By selectively removing the cotter pin and raising the header, the L-shaped slot structure is so shaped that the end of the lock link confined within the slot moves along the first area towards the second area. Once the confined end of the lock link reaches the end portion of the first area, the absence of the cotter pin allows that end of the lock link to gravitate down into the second area of the slot, thereby positioning the header for transport.

It is therefore the principal object of the present invention to provide a simple, relatively inexpensive, easy to actuate transport lock link system for the header for an agricultural harvesting machine.

A further object of the present invention is to provide a transport lock link assembly of a unitary design which does not require additional parts or the use of tools to actuate.

Other objects and advantages of the present invention will become apparent and obvious from a study of the following description and the accompanying drawings which are merely illustrative of the present invention.

BRIEF DESCRIPTION OF THE DRAWINGS

FIG. 1 is a side elevational view of an agricultural harvesting machine of the mower conditioner type having the transport lock link assembly of the present invention associated therewith, the mower conditioner being shown in an operative mode with the header adapted to engage the ground and float relative to the main frame of the mower conditioner in response to the header moving over various undulations in the ground.

FIG. 2 is a side elevational view of the mower conditioner shown in FIG. 1 with the header raised to the transport position and held therein by the transport lock link assembly of the present invention.

Figure 3:
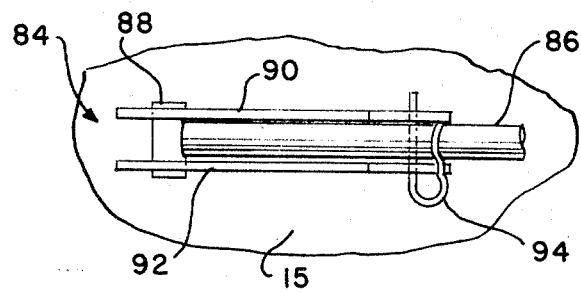
FIG. 3 is a fragmentary plan view of a selected portion of the lock link assembly of the present invention.

In the following description right-hand and left-hand reference is determined by standing to the rear of the mower conditioner and facing in the direction of travel.

DESCRIPTION OF THE PREFERRED EMBODIMENT

With reference to the drawings, particularly FIGS. 1 and 2, a mower conditioner of the pull type is shown therein and indicated generally by the numeral 10. The mower conditioner 10 comprises a generally L-shaped main frame 12 which includes a transverse tube or shaft 14 and a side frame member 15 pivotally connected to the left end of the shaft 14 by a strap construction 18, the strap construction 18 being curved around the transverse shaft 14 and bolted to the side frame member 15. Although not particularly shown, the strap 18 is prevented from moving axially along shaft 14 by a pair of spaced apart rings that are welded to the shaft. Extending forwardly from the side frame member 15 is a tongue 16 which includes a clevis 20 fixed about the forward end thereof and particularly adapted to be connected to a tractor, not shown. It is thus appreciated that the side frame member 15 because of the strap construction is pivotally moveable relative to the transverse shaft 14.

Continuing to refer to the main frame 12 of the mower conditioner shown in FIGS. 1, 2 and 3, a pair of rearwardly extending axially spaced wheel arms 22 are fixed to the transverse shaft 14 and extend generally rearwardly therefrom, each wheel arm 22 having a rear wheel 24 rotatively mounted to the rear end thereof. Fixed to each wheel arm 22 and extending generally vertically therefrom is a rear upstanding frame member 26.

A header, denoted by the numeral 28 and which will be described in greater detail subsequently, is moveably mounted relative to the main frame 12 by a header actuating linkage structure. The header actuating linkage structure comprises a pair of inwardly disposed, axially spaced lower actuating arms 30 fixed to the transverse shaft 14. The lower actuating arms 30 are connected to lower respective portions of the header 28 by a pair of lower connecting links 32. The upper portion of the header 28 is connected to the rear upstanding frame members 26 by an upper link 34, the upper link 34 being generally parallel to the lower link 32, thereby tending to maintain the header 28 in a parallel posture as the header floats over various undulations in the ground surface being traversed by the mower conditioner 10. Header 28 is generally biased for flotation by a pair of counter balancing springs 36, each interconnected between a respective upstanding frame member 26 and the header 28.

Welded, or secured by other suitable means, to the left end portion of the transverse shaft 14 is a transport actuating arm 38. To power the actuating arm 38, a remotely controlled hydraulic cylinder 40 is disposed between the main frame 12 and the actuating arm 38 and adapted to move the actuating arm relative to the main frame. In particular, the hydraulic cylinder 40 is anchored about the upper surface of the side frame member 15 and includes a rod extending therefrom with the rearmost portion of the rod connected to the actuating arm 38. Thus, it is seen that the extension of the rod 42 results in the actuating arm 38 being moved rearwardly, which results in the transverse shaft 14 being rotated clockwise, as viewed in FIGS. 1 and 2, thereby causing the header 28 to be raised relative to the main frame 12 by the combined action of the header actuating linkage just described. Specifically, it will be seen that the clockwise movement of the transverse shaft 14 causes the lower links 32 to move generally forwardly. Also, the same clockwise movement causes the transverse shaft 14 to be slightly elevated due to the wheel arms 22 being rotated. The slight elevation of the transverse shaft 14 and the clockwise movement of the wheel arms 22 causes the rear upstanding members 26 to move rearwardly. The rearward movement of the upstanding members 26 tends to pull the upper links 34 rearwardly also, thereby tending to maintain the head 28 in a parallel relationship relative to the main frame 12.

Figure 5:
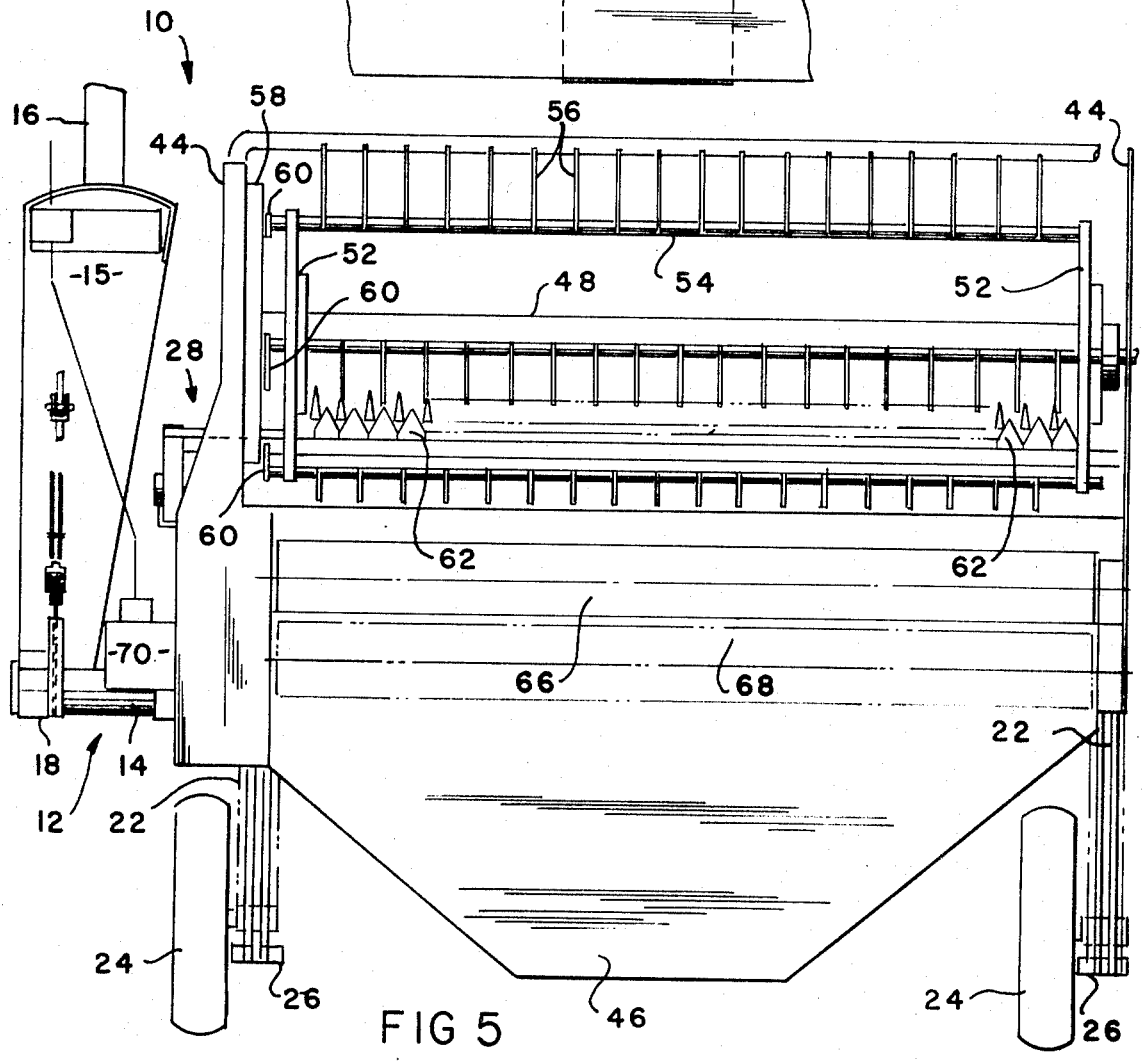
FIG. 5 is a plan view of the mower conditioner shown in FIGS. 1 and 2 with a forward portion of the tongue and side drive not being particularly shown.

Now preceding with a detailed description of the header 28, it will be seen from FIGS. 1, 2 and 5 that the header illustrated in the present drawings basically comprises a pair of side sheets 44 and a windrow shield structure 46, the windrow shield structure extending generally rearwardly from the header 28 and particularly adapted to converge the swath of crop material cut into a relatively narrow and fluffy windrow. Transversely disposed about the forward portion of the header 28 is a crop engaging reel including a reel tube 48, as best seen in FIG. 5, rotatively mounted about a reel shaft 50 (FIGS. 1 and 2). Fixed on opposite end portions of the reel tube 48 is a pair of spider assemblies 52, the spider assemblies having a series of circumferentially disposed tine bars 54 rotatively mounted therebetween with each tine bar having a plurality of generally radially extending tines 56. To actuate the tine bars 54 and consequently the tines 56 associated therewith, a stationary cam track 58 is disposed between the left side sheet 44 and the left spider assembly 52. Each tine bar 54 includes a cam following mechanism 60 engaged with the cam track 58 and operative to rotate the respective tine bar in response to the rotation of the reel about the main reel shaft 50.

To cut the oncoming crop, a conventional reciprocating cutter bar 62 is transversely disposed within the header 28, the cutter bar being particularly spaced generally below and rearwardly of the above described reel. The cutter bar 62 is reciprocated back and forth by a conventional wobble drive, indicated generally in FIGS. 1 and 2 by the numeral 64.

As previously noted, the agricultural harvesting machine of the present invention is of the mower conditioner type. To condition the crop engaged by the reel and cut by the cutter bar 62, the header 28 is provided with a pair of cooperating transversely disposed conditioning rolls, the conditioning rolls being referred to as an upper conditioning roll 66 and a lower conditioning roll 68. Although the type of mower conditioner shown conventional drive and for purposes of general explanation it will be observed from FIGS. 1 and 2 that a gearbox 70 is mounted on the left side of the header 28. The gearbox 70 receives driving torque from a series of universal drive shafts 72,74,76, with the universal drive shafts being supported at intermediate points by a pair of support posts 78,80. From the gearbox 70, the reel, cutter bar and wobble drive, and conditioning rolls 66,68 are driven by a conventional set of chains and/or belts with the various components being driven at preselected speeds relative to the other components.

Figure 4:
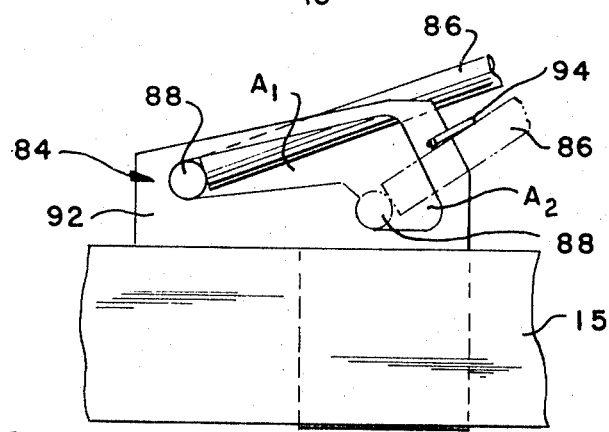
FIG. 4 is a fragmentary side elevational view of a selected portion of the lock link assembly of the present invention.

The transport lock link assembly of the present invention is indicated generally by the numeral 82 and basically comprises an L-shaped slot structure 84 fixed upon the upper surface of side frame member 15, and a lock link 86 having one end pivotally connected to the transport actuator arm 38 and the other end confined within the L-shaped slot structure 84. From FIG. 3 it is seen that said other end of the lock link 86 includes a cross pin 88 with the cross pin being confined within the generally L-shaped slot structure. Viewing the generally L-shaped slot structure 84 in detail, it will be observed that the slot structure comprises a pair of laterally spaced plates 90,92, with each plate having a generally L-shaped opening formed therein. The plates 90,92 include stop means 94 in the form of a removeable cotter pin, the cotter pin being particularly disposed such that it traverses the vertical plane of the lock link 86. With particular reference to FIG. 4, it will be observed that the top elongated portion of the L-shaped openings in the plates 90,92 is referred to as a first area $A_1$, and that the lower rearmost area is referred to as a second area $A_2$.

In the normal operative mode of operation, the header 28 is allowed to float relative to the main frame 12 as the header traverses various changes in the level of the ground terrain being traversed. In this operative mode the lock link 86 is disposed as shown in full lines in FIG. 4, the cross pin 88 being confined within the first area $A_1$ of the generally L-shaped slot structure 84. While in the first area $A_1$, the cross pin can move back and forth between first and second extreme positions.

Once it is desired to raise the header 28 to a transport or service position, the stop means (cotter pin) 94 is removed from the slot structure 84. Next, the hydraulic cylinder 40 is actuated causing the rod 42 to extend therefrom, causing the lever arm 38 to move clockwise as viewed in FIG. 1 and 2. The clockwise movement of the lever arm 38 results in the header 28 being moved upwardly relative to the main frame 12. As the header 28 moves upwardly, the cross pin 88 and the lock link 86 tends to move rearwardly. Upon reaching the rearmost portions of the L-shaped slot, the cross pin 88 tends to gravitate from the first area $A_1$ to the second area $A_2$ as the second area $A_2$ is disposed generally below the level of the first area $A_1$. Once the cross pin 88 is disposed in the second area $A_2$, as shown in FIG. 2 and as illustrated in phantom in FIG. 4, the header 28 is maintained in the transport position. To assure that the cross pin does not move from the second area $A_2$, the stop means 94 in the form of the cotter pin is reinstated into the generally L-shaped slot structure 84.

To place the lock link 86 back into the operative mode, the hydraulic cylinder 40 is once again actuated causing the cross pin to be lifted slightly from the position shown in phantom in FIG. 4. Once the force is removed from the cross pin 88, the cotter pin is removed and the lock link 86 can be shifted back to its operative position, shown in full lines in FIG. 4.

Therefore, it is seen that the lock link assembly for the header of the agricultural harvesting machine shown herein is quite simple and can be easily actuated by the operator without the use of tools or additional parts. Moreover, the lock link assembly of the present invention allows the header to be moved through the use of the hydraulic cylinder, during the operative mode providing a system that is readily changeable to all positions including where the lock link maintains the header in a raised transport position.

The terms, "upper," "lower," "forward," "rearward" etc. have been used herein merely for the convenience of the foregoing specification and in the appended claims to describe the transport lock link for a mower conditioner and its parts as oriented in the drawings. It is to be understood, however, that these terms are in no way limiting to the invention since the transport lock link for a mower conditioner may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

Having thus described our invention, what we claim is:

1. In a pull type mower conditioner having a generally L-shaped main frame, a header movably mounted relative to said main frame and adapted to float relative to said main frame, a header actuating linkage structure interconnecting said main frame and said header and a hydraulic cylinder interconnected between said main frame and said header actuating linkage structure for selectively raising said header from an operative position to a transport position, the improvement comprising a transport lock link assembly for maintaining said header in the transport position, said lock link assembly comprising a generally L-shaped slot structure fixed to said main frame, a lock link having one end secured to said header actuating linkage structure and the other end confined within said generally L-shaped slot and movable within a first area therein when said header is raised or lowered by means of the said hydraulic cylinder, and adapted to be confined within a second area, adjacent and generally below said first area, for locking said header in the transport position; and removable stop means associated with said generally L-shaped slot structure for selectively confining said other end of said lock link in either area of said generally L-shaped slot.

2. The invention, as recited in claim 1, wherein said L-shaped slot structure includes a pair of laterally spaced plates each fixed to said main frame and having a generally L-shaped opening formed therein; and wherein said other end of said lock link comprises a cross pin, said cross pin being confined within the L-shaped openings.

3. The invention, as recited in claim 1, wherein said removable stop means normally disposed transversely within said generally L-shaped slot structure, and which said stop prevents the confined portion of said lock link from inadvertenly moving between the respective operation and transport positions of the L-shaped opening.

4. The invention, as described in claim 1 wherein said second area of said generally L-shaped slot is disposed adjacent and generally below said first area, whereby the said other end of said lock link normally gravitates from said first area to said second area when the header is placed in a transport position, through the use of the said hydraulic cylinder and when said stop means is removed.

5. The invention as recited in claim 1, wherein said removable stop means consists of a pin transversely placed across the L-shaped slot.

* * * * *